United States Patent
Freeman et al.

(10) Patent No.: US 12,443,970 B2
(45) Date of Patent: *Oct. 14, 2025

(54) SYSTEM AND METHOD FOR DETERMINING CONTENT EFFECTIVENESS BASED ON DWELL TIME ESTIMATION

(71) Applicant: Walmart Apollo, LLC, Bentonville, AR (US)

(72) Inventors: Philip Barrett Freeman, Rogers, AR (US); Adam Christian Henrie, Bentonville, AR (US); Amir Alonzo Jenkins, San Jose, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/390,070

(22) Filed: Dec. 20, 2023

(65) Prior Publication Data
US 2024/0221025 A1    Jul. 4, 2024

Related U.S. Application Data

(60) Provisional application No. 63/435,745, filed on Dec. 28, 2022.

(51) Int. Cl.
*G06Q 30/02* (2023.01)
*G06Q 30/0242* (2023.01)

(52) U.S. Cl.
CPC .................. *G06Q 30/0242* (2013.01)

(58) Field of Classification Search
CPC ......... G06Q 30/0242; G06Q 30/0201
See application file for complete search history.

(56) References Cited

U.S. PATENT DOCUMENTS

| 8,380,558 B1 * | 2/2013 | Sharma ............... G06Q 30/02 348/69 |
| 9,424,590 B2 | 8/2016 | Gerard |

(Continued)

OTHER PUBLICATIONS

"Traffic Intelligence: The Science of Shopper Conversion" (Szklany, Craig and Stier, Mark; published Jan. 4, 2013 at https://chainstoreage.com/news/traffic-intelligence-science-shopper-conversion) (Year: 2013).*

(Continued)

*Primary Examiner* — James M Detweiler
(74) *Attorney, Agent, or Firm* — Morgan, Lewis & Bockius LLP; Manita Rawat

(57) ABSTRACT

Systems and methods for determining content effectiveness are disclosed. In some examples, a media device located in a store of an entity displays content about a product. A shopping assistant device owned by the entity has an asset identifier (ID) thereon and is used by a customer to assist the customer's shopping. A first sensor generates velocity data of the asset ID passing the media device during a display of the content. A second sensor detects the asset ID around a checkout device during or after the display of the content. A processor is configured to: determine a pass time period for the asset ID to pass the media device, estimate a dwell time period of the customer based on the velocity data, obtain purchase data associated with the shopping assistant device, and determine an effectiveness of the content based on information about: the pass time period, the dwell time period, the product, and the purchase data.

16 Claims, 14 Drawing Sheets

(56) References Cited

U.S. PATENT DOCUMENTS

| | | | |
|---|---|---|---|
| 11,037,196 B2 | 6/2021 | Fernandez | |
| 11,615,430 B1* | 3/2023 | Sharma | G06Q 30/0201 |
| | | | 705/7.29 |
| 2005/0187819 A1 | 8/2005 | Johnson | |
| 2006/0293968 A1 | 12/2006 | Brice et al. | |
| 2007/0007337 A1 | 1/2007 | Clark et al. | |
| 2008/0189170 A1 | 8/2008 | Ramachandra | |
| 2008/0231448 A1 | 9/2008 | Fowler et al. | |
| 2008/0237339 A1 | 10/2008 | Stawar et al. | |
| 2009/0030780 A1* | 1/2009 | York | G06Q 30/02 |
| | | | 705/7.29 |
| 2012/0019393 A1* | 1/2012 | Wolinsky | G06Q 30/02 |
| | | | 340/686.1 |
| 2012/0271715 A1* | 10/2012 | Morton | G06Q 30/0257 |
| | | | 705/14.53 |
| 2017/0066464 A1 | 3/2017 | Carter et al. | |
| 2023/0252556 A1 | 8/2023 | Ward et al. | |
| 2023/0385875 A1* | 11/2023 | Nigul | G06Q 30/0261 |
| 2024/0094005 A1* | 3/2024 | Kovacs | G06Q 10/0833 |

OTHER PUBLICATIONS

E.N. Cinicioglu et al., "Use of Radio Frequency Identification for Targeted Advertising: A Collaborative Filtering Approach Using Bayesian Networks," K. Mellouli (Ed.): ECSQARU 2007, LNAI 4724, (Year: 2007) pp. 889-900.

IBM, "Advertising system targeted to tracked shopping carts," IP.com No. IPCOM000176974D, Dec. 2, 2008, 2 pages.

* cited by examiner

SYSTEM AND METHOD FOR DETERMINING CONTENT EFFECTIVENESS BASED ON DWELL TIME ESTIMATION

CROSS-REFERENCE TO RELATED APPLICATION

This application claims benefit to U.S. Provisional Application Ser. No. 63/435,745, entitled "System and Method for Determining In-Store Advertisement Effectiveness based on Dwell Time Estimation," filed on 28 Dec. 2022, the disclosure of which is incorporated herein by reference in its entirety.

TECHNICAL FIELD

This application relates generally to content effectiveness determination and, more particularly, to systems and methods for determining effectiveness of product-related content based on an estimation of customer dwell time.

BACKGROUND

Content elements can be displayed via either online or offline platforms. Providing targeted content is key to improving content effectiveness, which is interesting to both the platform and the content provider. Providing online content (e.g., presented on a website) targeted to online users can be determined based on user identifiers (IDs) and click through rates of the online users of the website. In contrast, there is no easy alternative way to determine providing targeted offline content.

In some instances, content targeted to an offline customer may be determined using a camera located in a physical space. But a line of sight (LOS) is required and a cost issue may arise when using the camera to determine content effectiveness of content elements within the physical space.

SUMMARY

The embodiments described herein are directed to systems and methods for determining effectiveness of product-related content based on an estimation of customer dwell time.

In various embodiments, a system configured to determine content effectiveness is disclosed. The system includes: a media device, at least one first sensor, a second sensor and at least one processor. The media device is located at a physical store associated with an entity and configured to display content associated with a product being offered for purchase in the physical store. A shopping assistant device owned by the entity is used by a customer to assist the customer's shopping in the physical store and has an asset identifier (ID) coupled to the shopping assistant device. The at least one first sensor is configured to generate velocity data of the asset ID passing a first predetermined range around the media device during a display of the content on the media device. The second sensor is configured to detect the asset ID coupled to the shopping assistant device that is within a second predetermined range around a checkout device in the physical store during or after the display of the content on the media device. The at least one processor is operatively coupled to the at least one first sensor and the second sensor, and configured to: determine a pass time period for the asset ID to pass the first predetermined range, estimate a dwell time period of the customer based on the velocity data of the asset ID, obtain purchase data associated with the shopping assistant device, and determine an effectiveness of the content based on information about: the pass time period, the dwell time period, the product, and the purchase data.

In various embodiments, a computer-implemented method of determining content effectiveness is disclosed. The computer-implemented method includes steps of: presenting, via a media device located at a physical store associated with an entity, content associated with a product being offered for purchase in the physical store, wherein a shopping assistant device owned by the entity is used by a customer to assist the customer's shopping in the physical store and has an asset identifier (ID) coupled to the shopping assistant device; generating, via at least one first sensor, velocity data of the asset ID passing a first predetermined range around the media device during a display of the content on the media device; detecting, via a second sensor, the asset ID coupled to the shopping assistant device that is within a second predetermined range around a checkout device in the physical store during or after the display of the content on the media device; determining a pass time period for the asset ID to pass the first predetermined range; estimating a dwell time period of the customer based on the velocity data of the asset ID; obtaining purchase data associated with the shopping assistant device; and determining an effectiveness of the content based on information about: the pass time period, the dwell time period, the product, and the purchase data.

In various embodiments, a non-transitory computer readable medium having instructions stored thereon is disclosed. The instructions, when executed by at least one processor, cause a device to perform operations including: presenting, via a media device located at a physical store associated with an entity, content associated with a product being offered for purchase in the physical store, wherein a shopping assistant device owned by the entity is used by a customer to assist the customer's shopping in the physical store and has an asset identifier (ID) coupled to the shopping assistant device; generating, via at least one first sensor, velocity data of the asset ID passing a first predetermined range around the media device during a display of the content on the media device; detecting, via a second sensor, the asset ID coupled to the shopping assistant device that is within a second predetermined range around a checkout device in the physical store during or after the display of the content on the media device; determining a pass time period for the asset ID to pass the first predetermined range; estimating a dwell time period of the customer based on the velocity data of the asset ID; obtaining purchase data associated with the shopping assistant device; and determining an effectiveness of the content based on information about: the pass time period, the dwell time period, the product, and the purchase data.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1A:
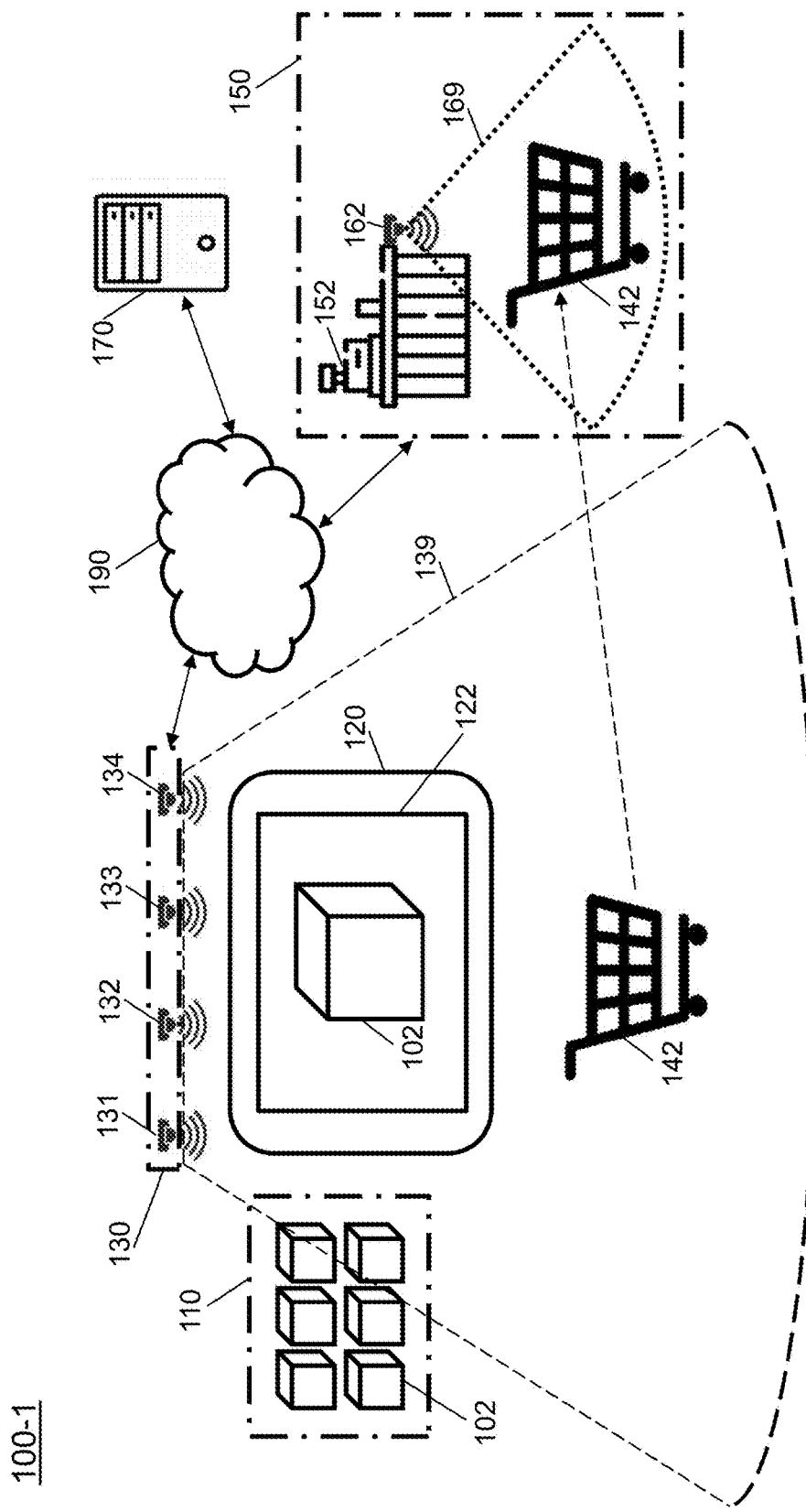
FIG. 1A illustrates a network environment configured to determine content effectiveness in a store, in accordance with some embodiments of the present teaching.

This description of the exemplary embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the systems.

One goal of the present teaching is to make in-store customer shopping experiences as curated, informative and personalized as online ones. Various embodiments of the present teaching provide proxy data solutions for better knowing customers without resorting to using personally identifiable information in every instance.

In some embodiments, a system is developed to use radio frequency (RF) tags to track the movement of a store-owned asset, which is used by customer(s) who pass displays showing advertisements in the store. In some embodiments, a single RF reader may be built into an advertising display. Using the time-stamped, unique cart identifier (ID) output of a single reader on an advertisement display to approximate total impressions (views) for a given advertisement campaign. Customer to cart ratios may vary and some inference may be used to determine typical views per cart pass. This is very valuable for addition of recording a pass-by timestamp for the impression over the current system of approximating impression counts through category sales, and will improve in-store advertisement charge models through more accurate counts of customer impressions.

In some embodiments, sales floor data and checkout RF readers may be used to determine advertisement effectiveness. For example, additional RF cart tag readers in the checkout space can be used to connect unique cart RF tag IDs, confirmed impressions of the targeted advertisements for co-purchase goods for that cart, and final purchases recorded by reading a cart's time at a particular checkout register.

In some embodiments, arrayed RF readers are used to determine customer dwell time and potential for information intake. For example, both the timestamp and telemetry data can be drawn from multiple RF tag readers placed in a fixed array to determine if a customer stopped to view an advertisement. If not stopped, the data can be used to determine how much advertisement information a customer was capable of taking in, given the time period the customer spent on passing the advertisement display. As such, a further refined in-store advertising charge rate model can be derived based on cart telemetry data for customer dwell time estimation at a display.

Furthermore, in the following, various embodiments are described with respect to method and systems for determining in-store advertisement effectiveness. In some embodiments, a media device is located in a store of an entity and configured to display an advertisement about a product. A shopping assistant device owned by the entity has an asset identifier (ID) thereon and is used by a customer to assist the customer's shopping. A plurality of first sensors are configured to generate velocity data of the asset ID passing by the media device during a display of the advertisement. A second sensor is configured to detect the asset ID coupled to the shopping assistant device around a checkout station during or after the display of the advertisement. At least one processor is configured to: determine a pass time period for the asset ID to pass the first predetermined range, estimate a dwell time period of the customer based on the velocity data, obtain purchase data associated with the shopping assistant device, and determine an effectiveness of the advertisement based on information about: the pass time period, the dwell time period, the product, and the purchase data.

In some embodiments, the physical infrastructure for the systems is established through a combination of the following components: in-store media used to deliver information that may influence a customer's purchasing decision; unique asset identifiers for company-owned resources used by customers during their shopping journey; and sensors capable of detecting and recording the presence of a unique asset identifier. Data captured in interactions between the three components can create a stream of proxy data for customer behavior. As such, the system can use information about movements of borrowed (or company owned) asset as a proxy to better understand the relationship between customer movements within the store relative to information display media, and to connect the proxy data back to the outcome of purchasing decisions without resorting to the use of personally identifiable information.

FIG. 1A illustrates a network environment 100-1 configured to determine advertisement effectiveness in a store, in accordance with some embodiments of the present teaching. The network environment 100-1 includes a plurality of devices or systems configured to communicate over one or more network channels, illustrated as a network cloud 190. For example, in various embodiments, the network environment 100-1 can include, but is not limited to, a plurality of first sensors 131, 132, 133, 134 in signal communication with a server processor 170, via the network cloud 190.

Although specific embodiments are discussed herein, it will be appreciated that additional systems can be included in the network environment 100-1. In addition, each of the illustrated systems in FIG. 1A can be combined into fewer systems and/or expanded into multiple additional systems configured to perform parallel, serial, and/or unrelated operations.

Each of the plurality of first sensors 131~134 may be located at a fixed location relative to a media device 120. The plurality of first sensors 131~134 forms a sensor array 130. In the example shown in FIG. 1A, the sensor array is located above the media device 120. In other examples, the sensor array may be located below the media device 120, on the left side of the media device 120, on the right side of the media device 120, or anywhere in a proximity to the media device 120.

In the example shown in FIG. 1A, the plurality of first sensors 131~134 are arranged along a same straight line. In other examples, the plurality of first sensors 131~134 may be formed in multiple lines or in any other manner. In some embodiments, the number of sensors in the sensor array 130 can be increased or decreased to a different number, e.g. depending on the environment around the media device 120.

The media device 120 may be located in a store of an entity, and is configured to display an advertisement 122 associated with a product 102 being offered for purchase in the store. In various examples, the media device 120 may be any in-store media used to deliver information that may influence a customer's purchasing decision.

During an in-store shopping experience, a retailer or vendor may present information for customers to consider when making their purchasing decisions. For example, a product commercial may be shown on an in-store television, which may be one example of the media device 120. In various embodiments, retailers and vendors may attempt to influence customers' purchasing decisions using various types of medias. Several examples of a broad media infrastructure for the media device 120 used to influence product and service purchases include, but not limited to: (1) a cardboard or paper signage either placed near products on a shelf, including 'Sale' and 'New' tags, or stand-alone display banners and other printed signage; (2) some demo products placed for customers' interaction; (3) a dispenser dispensing sample products; (4) a significant product arrangement, such as large beer case stacks for Super Bowl promotions and designated seasonal product sections of the store; (5) any electronic display including liquid crystal display (LCD), light-emitting diode (LED), and other display devices showing an image or video related to one or more products; (6) products set in prominent store locations, including main aisle features, entryways and endcaps to influence customers' purchasing decisions.

While the retailer or entity owning the store wants to obtain impression data of the advertisement 122 shown on the media device 120 to estimate advertisement effectiveness, it may not want to directly track a customer's body or face. But the store (or the retailer or entity) owns a plurality of shopping assistant devices which are used by customers to assist their shopping in the store. That is, each of the plurality of shopping assistant devices is an asset owned by the store (or the retailer or entity). For example, shopping assistant devices provided by the store may include, but not limited to: (1) a wheeled shopping cart; (2) a motorized shopping cart; (3) a handheld basket; (4) a handheld checkout equipment; (5) a pair of augmented reality (AR) glasses used for shopping assistance; (6) a tablet or phone used for shopping assistance.

In some embodiments, each of the plurality of shopping assistant devices has an asset identifier (ID) coupled to the shopping assistant device. The sensor array 130 in this example is located above the media device 120 and configured to detect an asset ID coupled to any shopping assistant device entering a predetermined detection range 139 around the media device 120.

As shown in FIG. 1A, the sensor array 130 can detect an asset ID within the predetermined detection range 139 around or near the media device 120. Whenever a shopping assistant device, e.g. a wheeled shopping cart 142, enters the predetermined range 139, the sensor array 130 will detect the asset ID coupled to the shopping assistant device 142. In this manner, the sensor array 130 can detect all asset IDs coupled to the shopping assistant devices that are within the predetermined range 139 around the media device 120 during a display of the advertisement 122 on the media device 120.

In some embodiments, each detection of an asset ID at the sensor array 130 is associated with a time stamp. In addition, a time period for the media device 120 to display the advertisement 122 can be obtained by the server processor 170, either through user input or via the network cloud 190. For example, in case the media device 120 is a paper cardboard showing the advertisement 122 of the product 102, a user or manager may input into the server processor 170 a start time when the cardboard is put there for presentation, and an end time when the cardboard is removed or replaced by other cardboards showing other advertisements. In another example, in case the media device 120 is an LED showing many advertisements including the advertisement 122 of the product 102, the LED may communicate with the server processor 170 via the network cloud 190 to indicate a time period for displaying the advertisement 122. Combining the time period for displaying the advertisement 122 with time stamps for detecting asset IDs of shopping assistant devices passing by the media device 120 or entering the predetermined range 139, either the server processor 170 or the sensor array 130 can determine a number of the shopping assistant devices within the predetermined range 139 around the media device 120 during a display of the advertisement 122 on the media device 120.

In some embodiments, based on signal strength received by each of the sensors 131, 132, 133, 134 in the sensor array 130, a localization method (e.g. based on triangulation) may be used to determine a location of the wheeled shopping cart 142 within the predetermined range 139. In addition, based on the location of the wheeled shopping cart 142 and the timestamp data, velocity data of the asset ID of the wheeled shopping cart 142 passing the predetermined range 139 during a display of the advertisement 122 on the media device 120 can be generated. For example, the sensor array 130 can calculate a moving speed and a moving direction of the wheeled shopping cart 142 within the predetermined range 139.

Based on the velocity data of the asset ID of the wheeled shopping cart 142, either the server processor 170 or the sensor array 130 can estimate a dwell time period of the customer using the wheeled shopping cart 142. In some embodiments, the dwell time period may be defined as a time period during which the customer's moving speed is zero. In some embodiments, the dwell time period may be defined as a time period during which the customer's moving speed is below a threshold. A dwell time period can indicate the customer paid how much attention or how likely the customer paid attention to the advertisement 122. A longer dwell time period can indicate a likely higher attention paid by the customer to the advertisement 122.

In addition, based on the timestamps when the asset ID of the wheeled shopping cart 142 enters and exits the predetermined range 139, either the server processor 170 or the sensor array 130 can determine a pass time period for the asset ID to pass the predetermined range 139 or pass by the media device 120. While a dwell time period can indicate how likely the customer paid attention to the advertisement 122, a zero dwell time period does not necessarily mean the customer paid zero attention. The pass time period may also indicate how much advertisement information the customer was capable of taking in. The longer the pass time period is, the more advertisement information the customer was likely to take in.

In some embodiments, as shown in FIG. 1A, the media device 120 is placed close to a product section 110 where a plurality of the products 102 is offered for purchase in the store. As such, when a customer is influenced by the advertisement 122 shown on the media device 120 and want to check or buy the product 102, it is convenient for the customer to go to the product section 110 directly to pick one of the products 102.

As shown in FIG. 1A, the network environment 100-1 also includes a checkout section 150 comprising one or more checkout stations, each of which is associated with a second sensor configured to detect asset IDs coupled to shopping assistant devices. Each checkout station is configured to record purchase orders of customers, including customers who passed the media device 120 with a shopping assistant device and then checked out items in the shopping assistant device at the checkout station.

As shown in FIG. 1A, the second sensor 162 is coupled to a right side of the checkout station 152, and is configured to detect an asset ID entering a predetermined range 169 around the checkout station 152. In other examples, the second sensor 162 may be coupled to the checkout station 152 at another side, via another portion, or via another manner. In this example, the wheeled shopping cart 142 that entered the predetermined range 139 during a display of the advertisement 122 on the media device 120, then entered the predetermined range 169 around the checkout station 152 for checking out product items in the wheeled shopping cart 142. The purchase data associated with the wheeled shopping cart 142 may include item quantity, item price, item ID, time stamp, etc. The checkout station 152 may communicate the purchase data associated with the wheeled shopping cart 142 to the server processor 170, e.g. via the network cloud 190. The second sensor 162 may communicate information about the wheeled shopping cart 142 entering the predetermined range 169, including e.g. asset ID, time stamp, etc., to the server processor 170, e.g. via the network cloud 190 or via the checkout station 152.

As such, the server processor 170 may obtain from the sensor array 130 information (e.g. quantity, time stamp, etc.) about the asset IDs of shopping assistant devices, including e.g. the wheeled shopping cart 142, that are within the predetermined range 139 during the display of the advertisement 122 on the media device 120. In addition, the server processor 170 may also obtain from the checkout section 150 information (e.g. quantity, time stamp, etc.) about the asset IDs of the shopping assistant devices, including e.g. the wheeled shopping cart 142, during or after the display of the advertisement 122 on the media device 120. Further, the server processor 170 may also obtain from the checkout section 150, e.g. the checkout station 152, the purchase data associated with the shopping assistant device 142. In some embodiments, the server processor 170 may determine an effectiveness of the advertisement 122 based on information about: the pass time period for the asset ID of the wheeled shopping cart 142 to pass the predetermined range 139, the dwell time period of the customer or the wheeled shopping cart 142 during the display of the advertisement 122, the product 102, and the purchase data.

For example, the server processor 170 may estimate an amount of advertisement information taken in by the customer, e.g. in terms of percentage or probability, during the display of the advertisement 122 based on the pass time period and the estimated dwell time period. The server processor 170 may also determine whether the customer finally purchases the product 102, and if so, a quantity of the purchased product 102, at the checkout station 152 after watching the advertisement 122, based on: information about the product 102, and the purchase data from the checkout station 152. The server processor 170 may then determine an effectiveness of the advertisement 122 based on the estimated amount of advertisement information taken in by the customer and the customer's final purchase decision regarding the product 102. In some embodiments, the server processor 170 may determine the effectiveness of the advertisement 122 based on multiple customers' estimated behavior in the same manner as discussed above regarding the customer using the wheeled shopping cart 142.

In some embodiments, once a shopping assistant device carrying an asset ID enters the checkout section 150 during or after the display of the advertisement 122, the asset ID is only recorded once in the second set of asset IDs and reset, because after the checkout the asset ID will probably be associated with a different customer using the shopping assistant device. For example, after the wheeled shopping cart 142 enters the predetermined range 169 and its asset ID is captured by the second sensor 162 for the first time during or after the display of the advertisement 122 on the media device 120, the wheeled shopping cart 142 is counted as one of the second set of shopping assistant devices. Then, the wheeled shopping cart 142 is reset regarding the detections of the sensor array 130 and the second sensor 162, because the wheeled shopping cart 142 may be used by a different customer after the checkout at the checkout station 152. That is, a same shopping assistant device will not be counted twice at the checkout station 152 (within a predetermined range around the checkout section 150 during or after the display of the advertisement 122 on the media device 120) when being linked to the shopping assistant devices detected in the predetermined range 139.

While there may be multiple customers using one same shopping assistant device during shopping, the number of shopping assistant devices can be used as good proxy data to estimate the number of customers using these shopping assistant devices. While a location of a customer using a shopping assistant device might not be exactly the same as a location of the asset ID attached to the shopping assistant device, the location of the asset ID can be used as good proxy data to estimate the location of the customer using the shopping assistant device. Similarly, the time stamps when the asset ID enters and exits a predetermined range around a sensor may be good proxy data to estimate the time stamps when the customer enters and exits the predetermined range, respectively. In addition, a moving velocity and dwell time of the asset ID may be good proxy data to estimate the moving velocity and dwell time of the customer, respectively.

As such, the system shown in FIG. 1A can use arrays of sensors installed in fixed locations throughout the store to capture the motion and telemetry of store-owned assets as they move (or stop) through their store path. In addition, the system can also use arrayed sensors, e.g. arrayed RF readers, to determine customer dwell time and potential information intake of the customers.

In various embodiments, the network cloud 190 may include: a WiFi® network, a cellular network such as a 3GPP® network or 5G® network, a Bluetooth network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. In some embodiments, the network cloud 190 can provide access to, for example, the Internet.

In some embodiments, the server processor 170 may be replaced by a plurality of processors, either centralized at one location or distributed at different locations. For example, each of the sensors 131, 132, 133, 134, 162 may be associated with a respective processor, and all processors are communicatively coupled to each other via the network cloud 190.

Figure 1B:
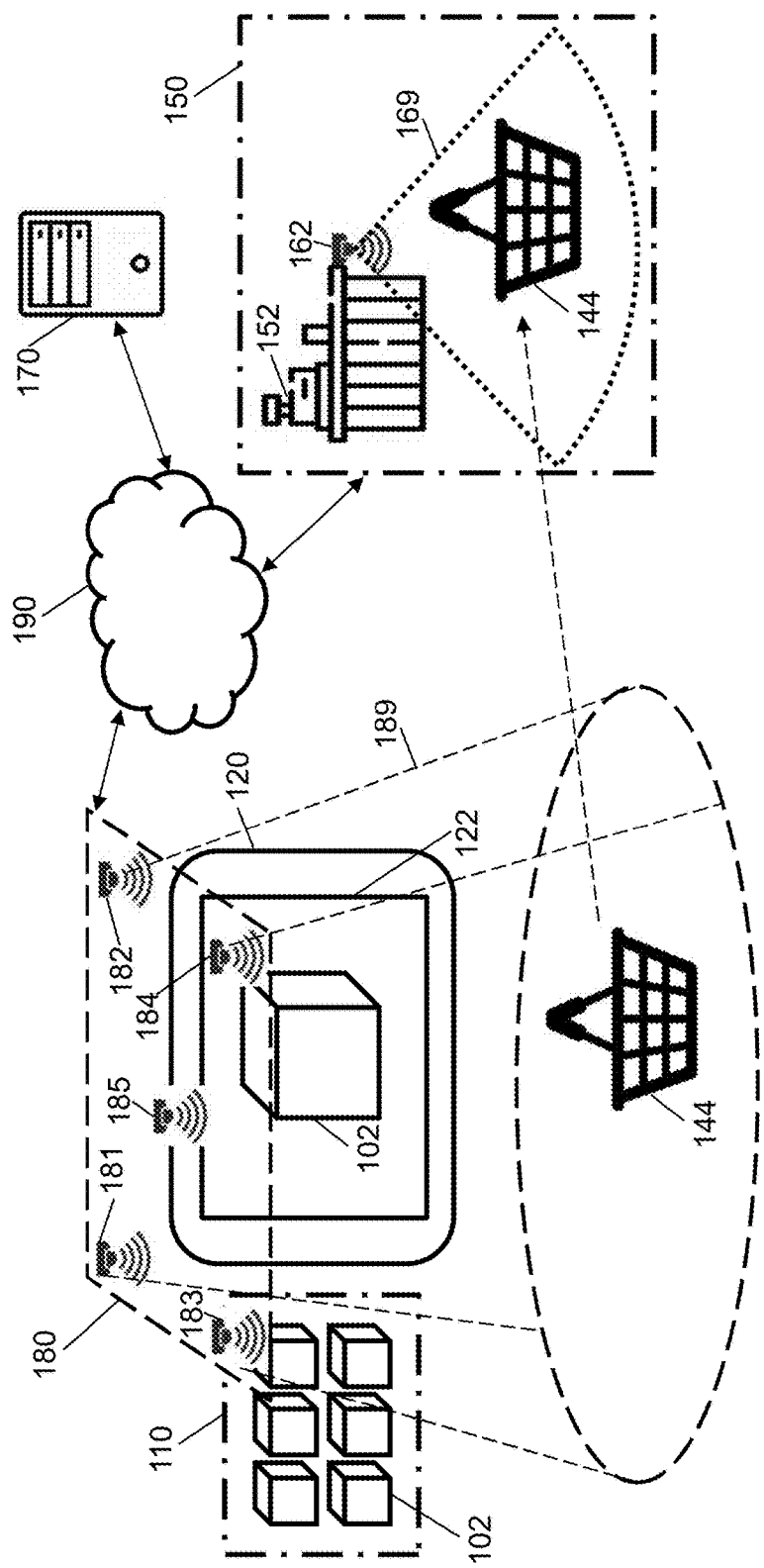
FIG. 1B illustrates another network environment configured to determine content effectiveness in a store, in accordance with some embodiments of the present teaching.

FIG. 1B illustrates another network environment 100-2 configured to determine advertisement effectiveness in a store, in accordance with some embodiments of the present teaching. The environment 100-2 is the same as the environment 100-1, except that the sensor array 130 is replaced by another sensor array 180, which includes five overhead sensors 181, 182, 183, 184, 185, installed on a ceiling portion near the media device 120. In the example shown in FIG. 1B, the overhead sensors 181, 182, 183, 184, 185 are arranged in a rectangular array on the ceiling. In other examples, the overhead sensors 181, 182, 183, 184, 185 may be arranged in a different array or according to a different manner. In some embodiments, the number of sensors in the sensor array 180 can be increased or decreased to a different number, e.g. depending on the environment around the media device 120.

As shown in FIG. 1B, a handheld basket 144 is detected by the sensor array 180. As such, the sensor array 180 can generate velocity data of the asset ID of the handheld basket 144 passing a predetermined detection range 189 of the sensor array 180 around the media device 120 during a display of the advertisement 122 on the media device 120.

Then at the checkout station 152, the asset ID of the handheld basket 144 is detected by the second sensor 162 when the customer is checking out. Similar to the discussions above regarding FIG. 1A, the system in FIG. 1B can determine a pass time period for the asset ID of the handheld basket 144 to pass the predetermined detection range 189, estimate a dwell time period of the customer using the handheld basket 144 based on the velocity data of the asset ID, obtain from the checkout station 152 purchase data associated with the handheld basket 144, and determine an effectiveness of the advertisement 122 based on information about: the pass time period, the dwell time period, the product 102, and the purchase data. The rest details regarding FIG. 1B can be referred to the above discussions regarding FIG. 1A.

Figure 2:
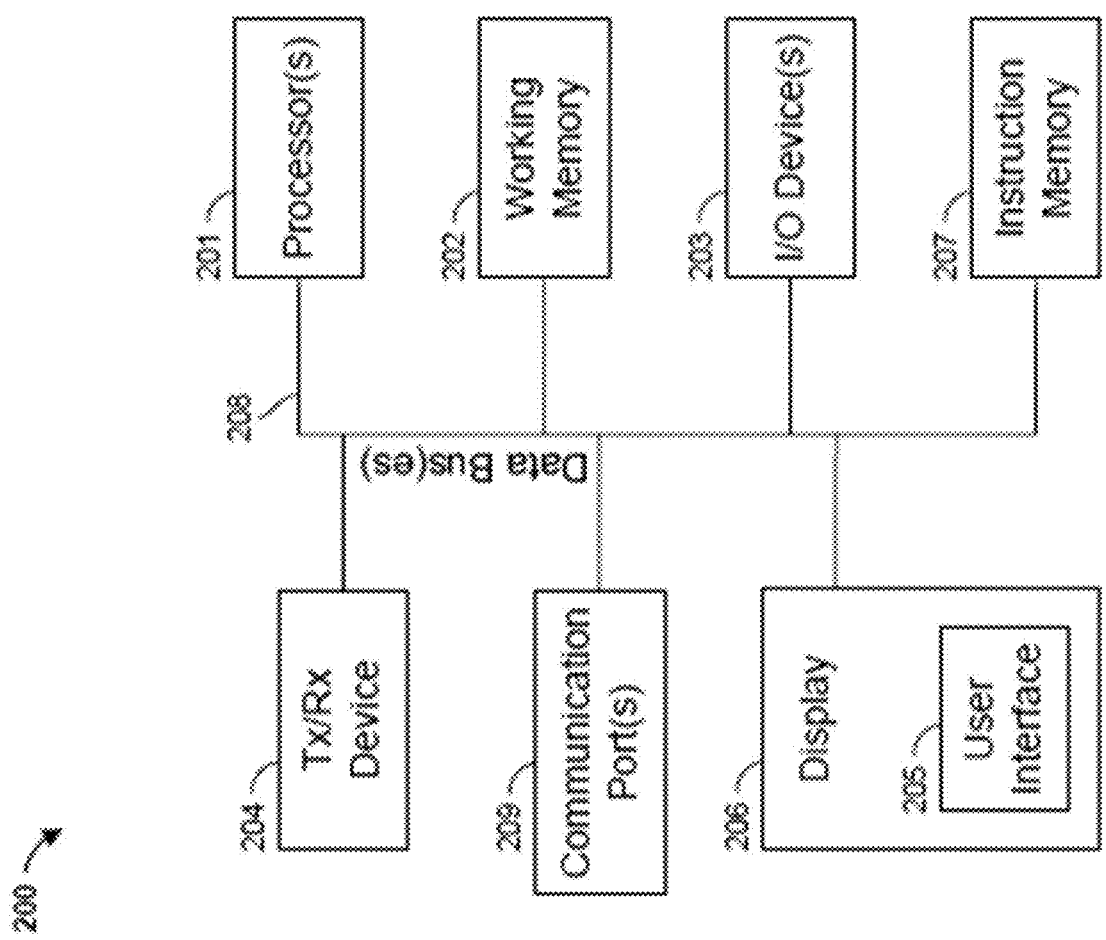
FIG. 2 illustrates a computer system configured to implement one or more processes to determine content effectiveness in a store, in accordance with some embodiments of the present teaching.

FIG. 2 illustrates a computer system 200 configured to implement one or more processes to determine advertisement effectiveness in a store, in accordance with some embodiments of the present teaching. In some embodiments, each sensor of the sensor array 130, the sensor array 180, the second sensor 162, and/or the server processor 170 may include the features shown in FIG. 2. In some embodiments, when the media device 120 is an electronic display, the media device 120 may also include the features shown in FIG. 2. For the sake of brevity, FIG. 2 is described relative to the server processor 170. It should be appreciated, however, that the elements described can be included, as applicable, in each sensor of the sensor array 130, the sensor array 180, the second sensor 162, and/or the media device 120.

As shown in FIG. 2, the server processor 170 can be a computing device 200 that may include one or more processors 201, a working memory 202, one or more input/output devices 203, an instruction memory 207, a transceiver 204, one or more communication ports 209, and a display 206, all operatively coupled to one or more data buses 208. The data buses 208 allow for communication among the various devices. The data buses 208 can include wired, or wireless, communication channels.

The one or more processors 201 can include one or more distinct processors, each having one or more processing cores. Each of the distinct processors can have the same or different structures. The one or more processors 201 can include one or more central processing units (CPUs), one or more graphics processing units (GPUs), application specific integrated circuits (ASICs), digital signal processors (DSPs), and the like.

The one or more processors 201 can be configured to perform a certain function or operation by executing code, stored on the instruction memory 207, embodying the function or operation. For example, the one or more processors 201 can be configured to perform one or more of any function, method, or operation disclosed herein.

The instruction memory 207 can store instructions that can be accessed (e.g., read) and executed by the one or more processors 201. For example, the instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

The one or more processors 201 can store data to, and read data from, the working memory 202. For example, the one or more processors 201 can store a working set of instructions to the working memory 202, such as instructions loaded from the instruction memory 207. The one or more processors 201 can also use the working memory 202 to store dynamic data created during the operation of the server processor 170. The working memory 202 can be a random access memory (RAM) such as a static random access memory (SRAM) or dynamic random access memory (DRAM), or any other suitable memory.

The input-output devices 203 can include any suitable device that allows for data input or output. For example, the input-output devices 203 can include one or more of a keyboard, a touchpad, a mouse, a stylus, a touchscreen, a physical button, a speaker, a microphone, or any other suitable input or output device.

The communication port(s) 209 can include, for example, a serial port such as a universal asynchronous receiver/transmitter (UART) connection, a Universal Serial Bus (USB) connection, or any other suitable communication port or connection. In some examples, the communication port(s) 209 allows for the programming of executable instructions in the instruction memory 207. In some examples, the communication port(s) 209 allow for the transfer (e.g., uploading or downloading) of data, such as machine learning algorithm training data.

The display 206 can display a user interface 205. User interfaces 205 can enable user interaction with the server processor 170. In some examples, a user can interact with the user interface 205 by engaging input-output devices 203. In some examples, the display 206 can be a touchscreen, where the user interface 205 is displayed by the touchscreen.

The transceiver 204 allows for communication with a network, such as the network cloud 190 of FIG. 1A. For example, if the network cloud 190 of FIG. 1A is a Wi-Fi network, the transceiver 204 may be configured to allow communications with the Wi-Fi network. In some examples, the transceiver 204 is selected based on the type of the network cloud 190 which the server processor 170 will be operating in. The processor(s) 201 is operable to receive data from, or send data to, a network, such as the network cloud 190 of FIG. 1A, via the transceiver 204.

Figure 3:
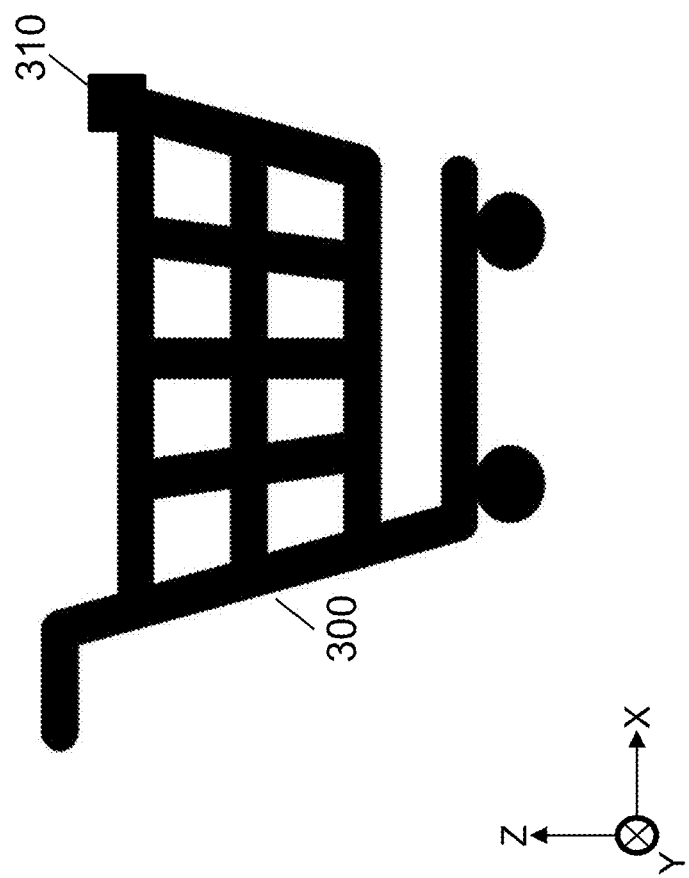
FIG. 3 illustrates an example of a shopping cart with an asset identifier (ID), in accordance with some embodiments of the present teaching.

FIG. 3 illustrates an example of a shopping cart 300 with an asset identifier (ID) 310, in accordance with some embodiments of the present teaching. In some embodiments, the shopping cart 300 may serve as any shopping assistant device, e.g. the wheeled shopping cart 142 as described in FIG. 1A, or the handheld basket 144 as described in FIG. 1B. The asset ID 310 may be attached to a portion of the shopping cart 300 without interfering the use of the shopping cart 300. In this example, the asset ID 310 is mounted to an upper front end of the shopping cart 300, along the X direction starting from the handle of the shopping cart 300. In other embodiments, the asset ID 310 may be mounted to other portions of the shopping cart 300 without impacting the methods and systems disclosed herein for determining advertisement effectiveness.

Figure 4A:
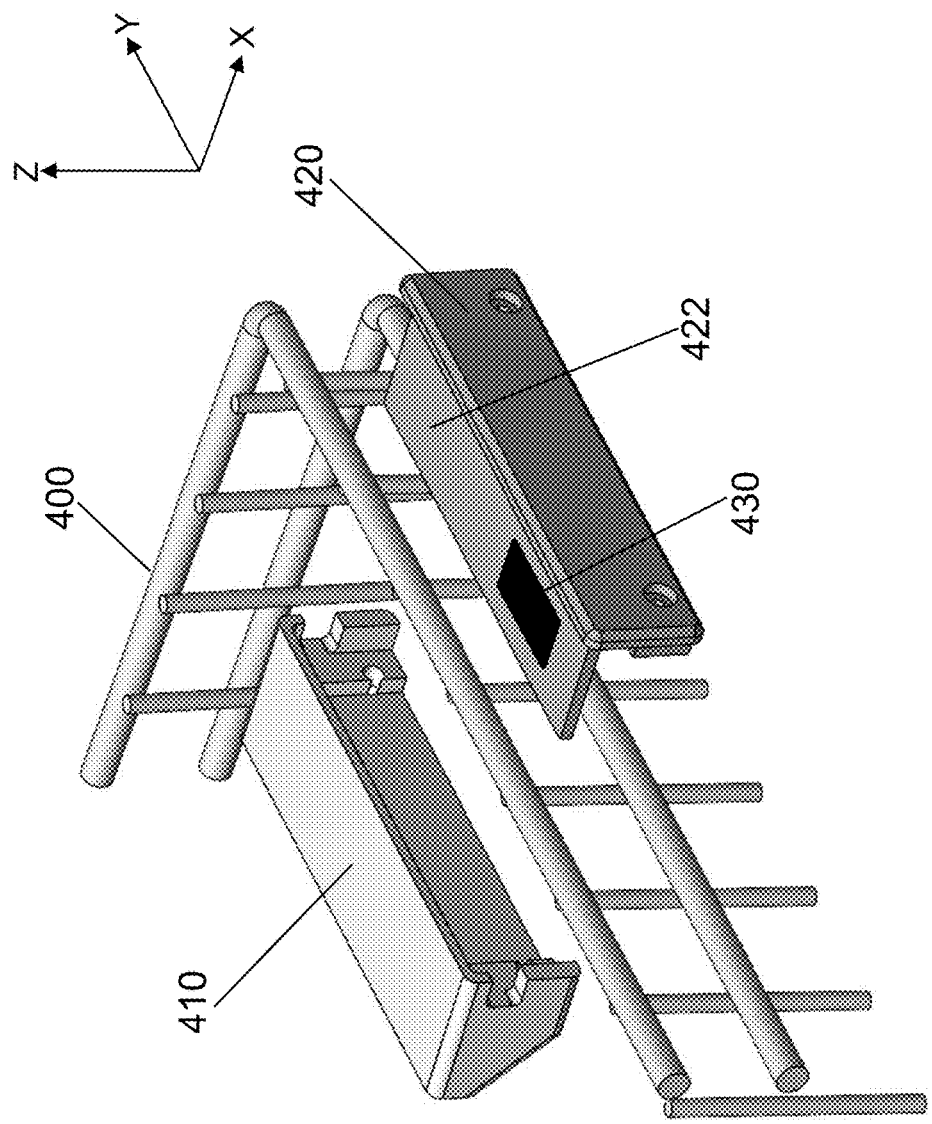
FIG. 4A illustrates an example of an asset ID before being attached to a shopping assistant device, in accordance with some embodiments of the present teaching.
Figure 4B:
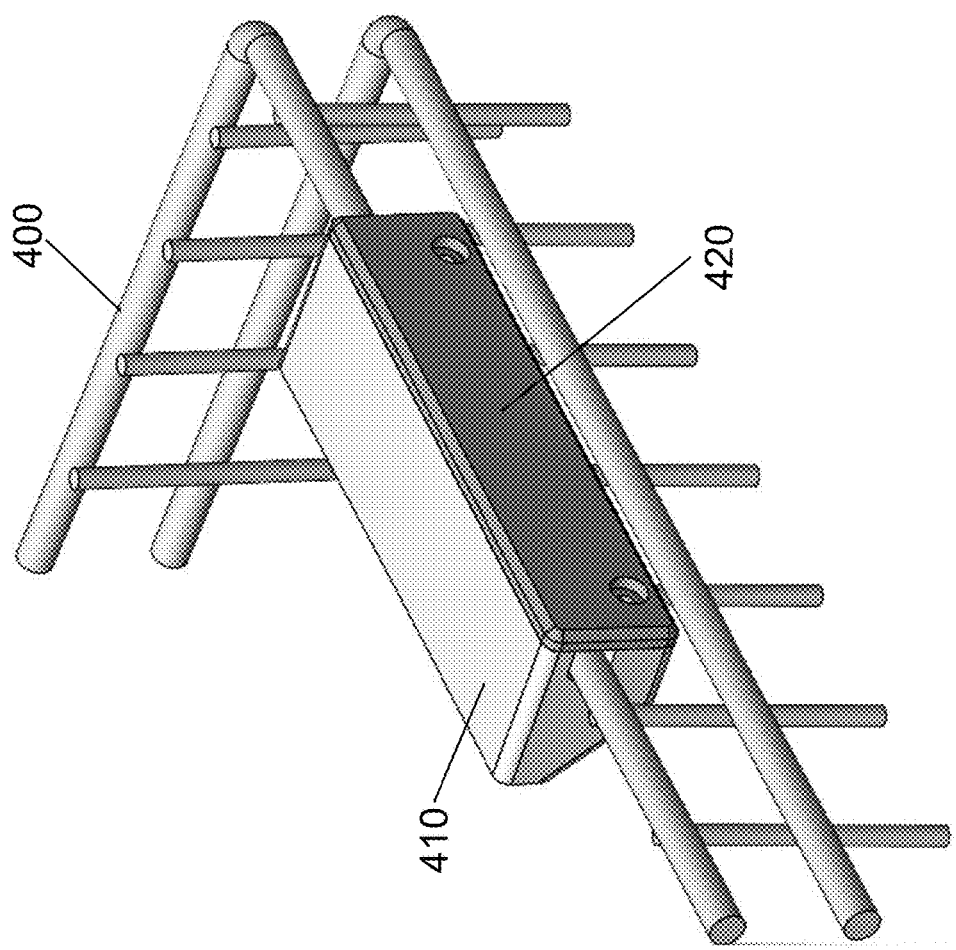
FIG. 4B illustrates an example of an asset ID after being attached to a shopping assistant device, in accordance with some embodiments of the present teaching.

FIG. 4A illustrates an example of an asset ID 430 before being attached to a shopping assistant device 400, in accordance with some embodiments of the present teaching. FIG. 4B illustrates an example of the asset ID 430 after being attached to the shopping assistant device 400, in accordance with some embodiments of the present teaching. In some embodiments, the shopping assistant device 400 may serve as any shopping assistant device, e.g. the wheeled shopping cart 142 as described in FIG. 1A, or the handheld basket 144 as described in FIG. 1B. As shown in FIG. 4A, a mounting device including two pieces 410, 420 are aligned to each other before being assembled to an upper front end of the shopping assistant device 400. The outer piece 420 has a latch portion 422 that will protrude into and be covered by the inner piece 410. The asset ID 430 may be attached to a top surface of the latch portion 422 as shown in FIG. 4A, and be covered by the inner piece 410 after the two pieces 410, 420 are assembled together on the upper front end of the shopping assistant device 400 as shown in FIG. 4B. In other embodiments, the asset ID 430 may be attached to the shopping assistant device 400 in other manners without impacting the methods and systems disclosed herein for determining advertisement effectiveness. In various embodiments, the asset ID 430 may be any one of: an RFID tag, a BLE tag, a QR code, a UPC code, an NFC tag, etc.

Company-owned or store-owned assets are commonly used by customers to assist their in-store shopping, including a common example of customers opting to use a company-owned shopping cart to assist with transporting the items they intend to purchase throughout the store. The disclosed system can incorporate unique identifiers into these company assets that can be detected by an accompanying sensor network. In some embodiments, any asset owned by the store or the entity can be assembled with a unique asset ID.

Figure 5:
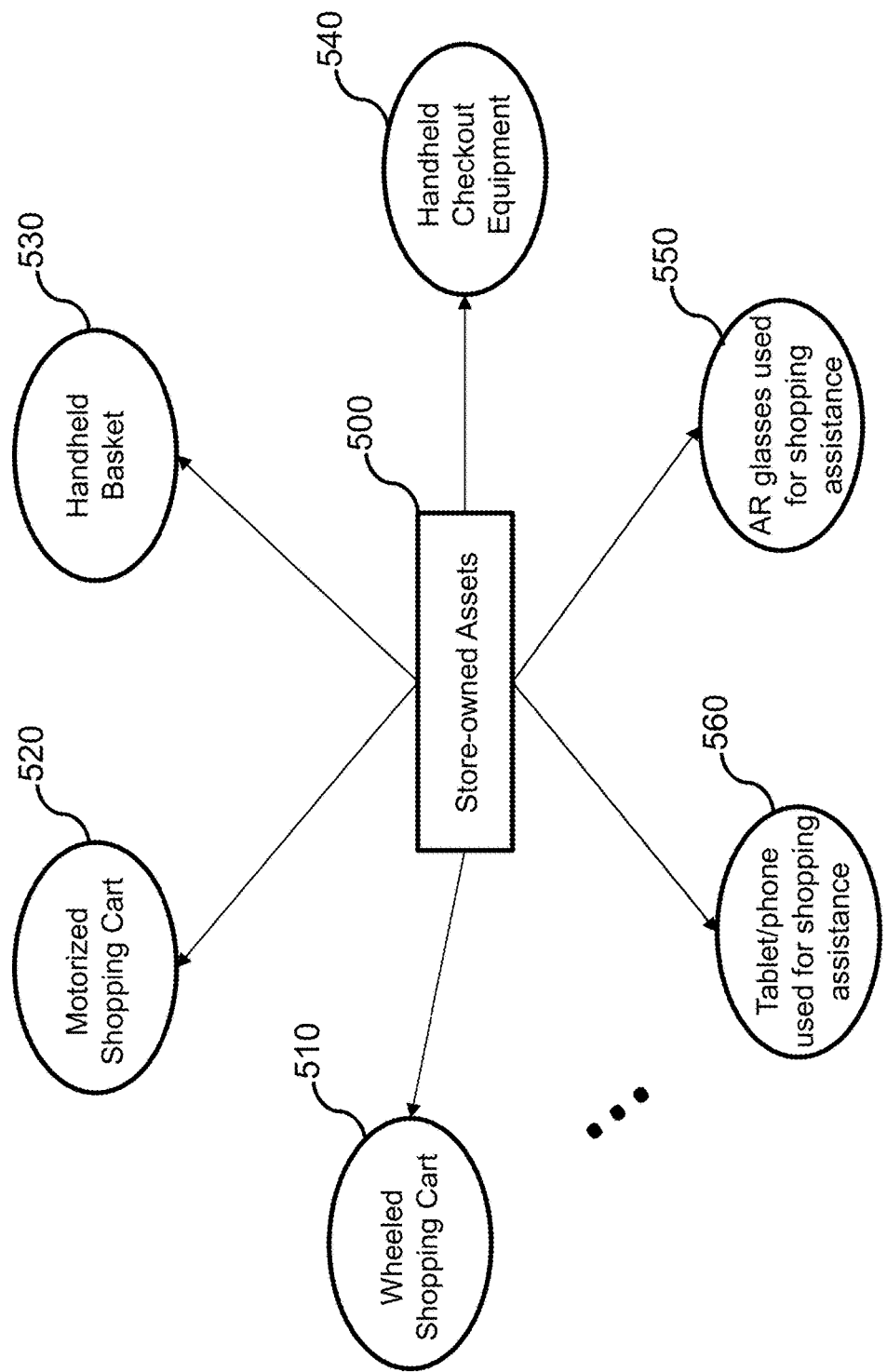
FIG. 5 illustrates various examples of shopping assistant devices owned by a store, in accordance with some embodiments of the present teaching.

FIG. 5 illustrates various examples of shopping assistant devices owned by a store, in accordance with some embodiments of the present teaching. As shown in FIG. 5, the store-owned assets 500 may include but not limited to: a wheeled shopping cart 510 that can be pushed by a customer during shopping, a motorized shopping cart 520 that can driven by a customer during shopping, a handheld basket 530 that can be carried by a customer during shopping, a handheld checkout equipment 540 that can be carried or put into a shopping cart or basket by a customer during shopping, a pair of AR glasses 550 provided by the store to assist a customer during shopping, a tablet or phone 560 provided by the store to assist a customer during shopping.

Figure 6:
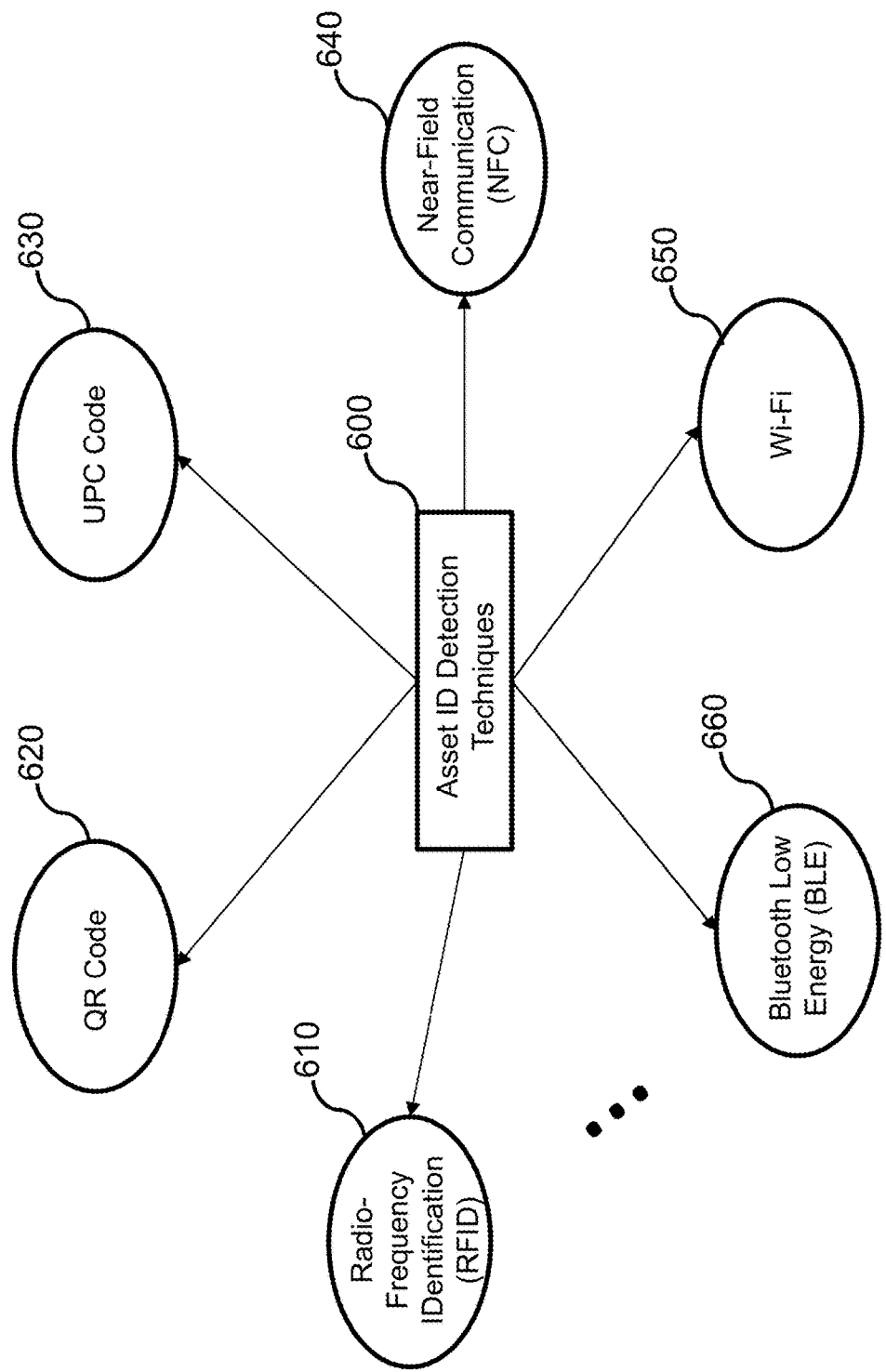
FIG. 6 illustrates various examples of asset ID detection techniques, in accordance with some embodiments of the present teaching.

In some embodiments, the detection of an asset ID may be based on any technique related to wireless scan or wireless communication. FIG. 6 illustrates various examples of asset ID detection techniques, in accordance with some embodiments of the present teaching. As shown in FIG. 6, the asset ID detection techniques 600 may include but not limited to techniques related to: a Radio-Frequency IDentification (RFID) 610, quick response (QR) code 620, universal product code (UPC) code 630, Near-Field Communication (NFC) 640, Wi-Fi 650, and Bluetooth Low Energy (BLE) 660.

For example, when each asset ID is an RFID tag attached to a respective shopping assistant device, each sensor of the sensor array 130 (or the sensor array 180) located at the media device 120 and the second sensor 162 located at the checkout station 152, will include an RFID reader that can detect and read RFID within a predetermined range from the sensor. In another example, when each asset ID is implemented on a BLE tag attached to a respective shopping assistant device, each sensor of the sensor array 130 (or the sensor array 180) located at the media device 120 and the second sensor 162 located at the checkout station 152, will include a BLE tag reader that can detect and read ID on the BLE tag within a predetermined range from the sensor. Similarly, the asset ID may also be implemented as a QR code, a UPC code, an NFC tag, etc.

Based on one or more of the asset ID detection techniques shown in FIG. 6, a network of sensors capable of detecting the location and/or movement of unique company asset identifiers throughout the store can be established to generate data connecting media exposure with final purchasing decisions as means to determine the effectiveness of information presented to customers during store shopping sessions. In some embodiments, the sensor network includes single sensors each installed at a fixed location throughout the store to capture information about the media encountered as a company asset is moved through the store, including sensors installed at stationary checkout equipment.

The system including sensors and asset identifier components described above is designed to generate data about the movement of store-owned or entity-owned assets through the store space over time. An underlying spatial data reference is required to relate media encountered during a shopping journey with final purchasing decisions. In some embodiments, major components of the data system described in detail below include: a base store spatial model (map or grid) to serve as a reference point for the spatial relationships between media and asset locations; sensor input data noting location, time and telemetry data of unique asset identifier reads; media data to note both store placement and the product, service or other relevant information being presented at a given location and time; store system information, including timestamped checkout data used to determine the final purchasing decisions tied to a unique asset identifier.

In some embodiments, a spatial grid model for each store is used to establish relationships between media (or media device), assets and sensors through a common coordinate reference system. Actual distances can be derived from this system as it is ultimately a copy of existing building blueprints and layout maps with known distances between physical objects such as doors, checkout registers and shelving locations. This basic model will store both the known location of existing assets and be used for recording pathways of company or store assets, and for recording derived 'interactions' between sensors, media and assets.

In some embodiments, data sensors can capture the presence (yes or no) of a unique asset identifier in a known location at a specific time. The strategic placement of sensors to capture tracked asset proximity to the known locations of media will create value in the resulting data.

In some embodiments, each sensor has a finite range for detecting unique asset identifiers and can be manipulated either through physical placement, signal attenuation or software controls to ensure the detection range is relevant for the media used. In an example of detecting customer interactions with demonstration products, setting a sensor capture range of just a few feet may be appropriate. In another example, a large overhead signage may be seen from many feet away and a much larger sensor read range can be set to record likely customer exposure to media when detecting the presence of assets used by them.

In some embodiments, each detection range of a sensor may be updated based on: the signal strength the sensor receives, the location or visibility of the associated media device, etc. For example, a sensor associated with a bigger TV at a top location may have a detection range larger than a sensor associated with a smaller TV at a bottom location. In some embodiments, the exact detection range for a sensor may be determined based on training data and testing to estimate a maximum distance where a customer can read the display on the media.

In some embodiments, each physical media type mentioned in the descriptions above can relate back to specific products or services and have finite promotional periods for their associated advertising campaigns. Simple media, like paper tags and other printed signage, have predetermined and fixed content but can easily be moved throughout the store or simply removed once an advertising campaign is complete. Data on the duration of these types of media in a specific location may be noted. The same unique asset identifiers mentioned in various embodiments can be added to these media to confirm their presence and location.

More complex media, like speakers, video displays and other electronics, are more permanent in their location but have a unique advantage over printed media in their ability to easily change content between several products or services. In some embodiments, the timestamped schedule of campaigns shown on digital media is a critical data point to be included in the system.

The systems described here ultimately provide value for the retailer or company owning the store by providing data to determine the effectiveness of media (e.g. advertisements) encountered during a shopping path on a customer's final purchasing decisions. Purchasing decision data is readily available through transaction logs now, but this is frequently tied to personally identifiable information if customers chose to use credit cards in the transaction.

Sensor data capturing the timestamped presence of a unique company asset identifier (e.g. a shopping cart) at a point of transaction (e.g. a mobile or stationary checkout station) can be used to tie previously derived data on the presence (or absence) of products in a cart, media encountered along a shopping journey and the presence of items at checkout to infer the effectiveness of media. Table I below shows some data type examples of data infrastructure in the system, wherein the time information is just shown for example.

TABLE I

| | | Data Type Examples of System Data Infrastructure | |
|---|---|---|---|
| Hardware Type | Hardware Example | Associated Data Type | Data Example |
| Media | Displayed product advertisement on a customer-facing television | Media ID | 243544534 |
| | | Content Type | Looping ad video for brand X, product Y |
| | | Campaign Time | 24 hour loop, Sep. 5, 2023- Apr. 1, 2024 |
| | | Location | 366,245 |
| | | Store | 2381 |
| Sensor | RF tag reader located near product advertisement display | Sensor ID | 8474-92874-021 |
| | | Location | 366,245 |
| | | Store | 2381 |
| | | Read range | 8 ft. |
| | | Intended coverage | Aisle K24, Sections 1-4 |
| | | Intended Media ID | 243544534 |

TABLE I-continued

Data Type Examples of System Data Infrastructure

| Hardware Type | Hardware Example | Associated Data Type | Data Example |
| --- | --- | --- | --- |
| Asset | Wheeled shopping cart with unique identifier RF tag | Asset ID<br>Asset type<br>Asset detectible distance | 3409BFP76558-234AKW84<br>Wheeled cart<br>7 ft. |
| Store System | Checkout register with multiple sensors capable of detecting assets and recording transactions | Store system ID<br>Store<br>Store system type<br>Store system sensor types | 4398732-KR<br>2381<br>Checkout register<br>UPC, RF, NFC, etc. |

Figure 7:
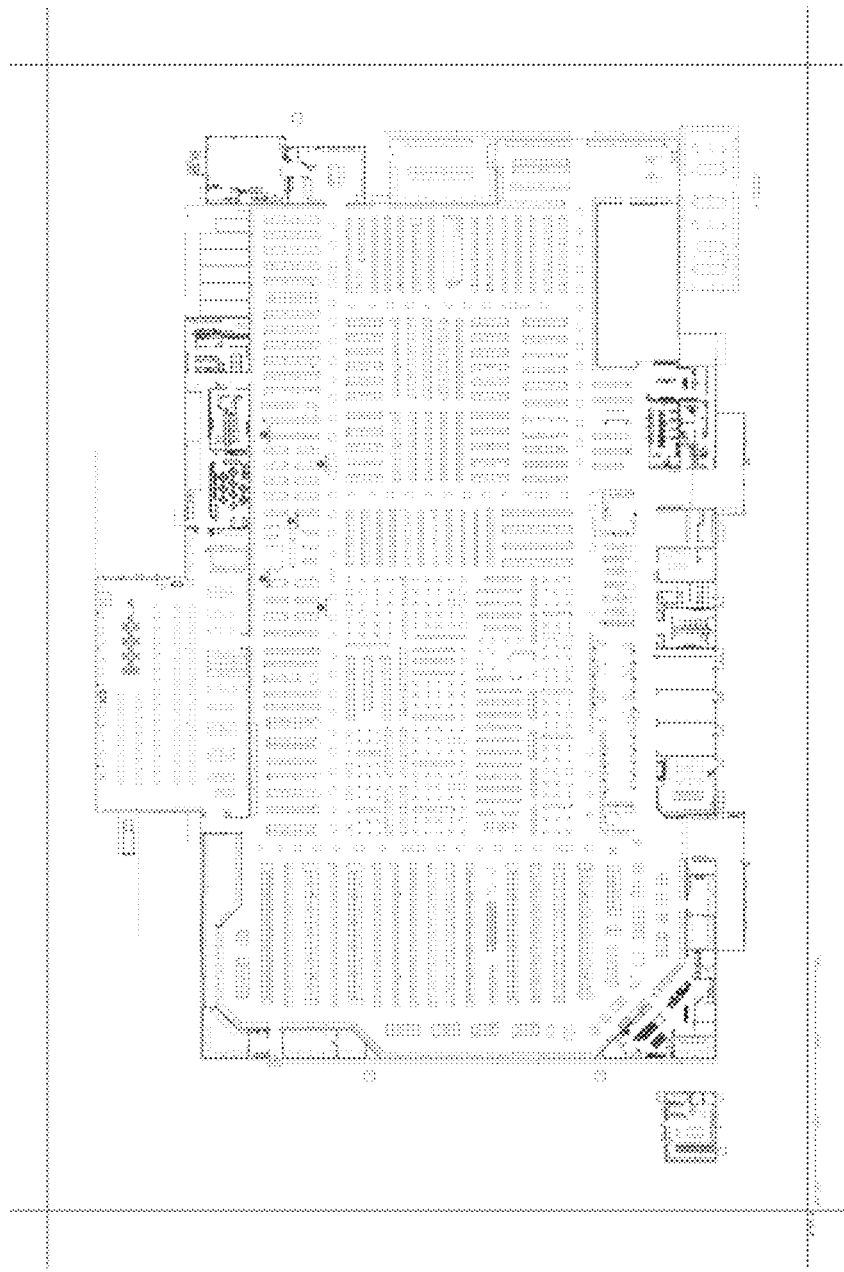
FIG. 7 illustrates an exemplary floor map of a store, in accordance with some embodiments of the present teaching.

FIG. 7 illustrates an exemplary floor map of a store based on a spatial grid model, in accordance with some embodiments of the present teaching. As shown in FIG. 7, the floor map is divided into 715*475 grids, with grid coordinates showing for the four corners: bottom left corner as (0,0); bottom right corner as (714,0); top left corner as (0, 474); and top right corner as (714, 474).

Based on the floor grid map, the system can relate components to each other. For example, when a store changes a media device at a certain location, e.g. by taking down a TV screen and putting up a cardboard sign, the location of that cardboard sign or TV screen can be recorded according to the floor grid map. As such, the system can just link the sensor located at that recorded location to the cardboard sign, rather than installing a new sensor every single time a new advertisement media is put up.

When a sensor is installed in the store for the first time, that location is noted and recorded in the system. Similarly, the location of an asset media, e.g. a media like a TV screen or a cardboard sign, is also recorded in the system. When the two locations are the same, e.g. both the media and the sensor shown in Table I above have a same location of (366, 245) at a same store 2381, the system will link or couple the media and the sensor together. Later, the system may decouple them if the media is replaced by a different media device or different media type.

Beyond the above described 1:1 sensor to asset examples noting the presence of an asset within a given grid space, data from the detection of a single asset identifier by multiple sensors can be used to generate more advanced information about an asset's movement over time. For example, asset movement through a space of continuous overlapping or adjacent sensor detection ranges can produce additional data on an asset's velocity, direction, and path taken through a store, as well as other telemetry data that can provide further insight on shopping behavior via the proxy data generated by the system.

Figure 8:
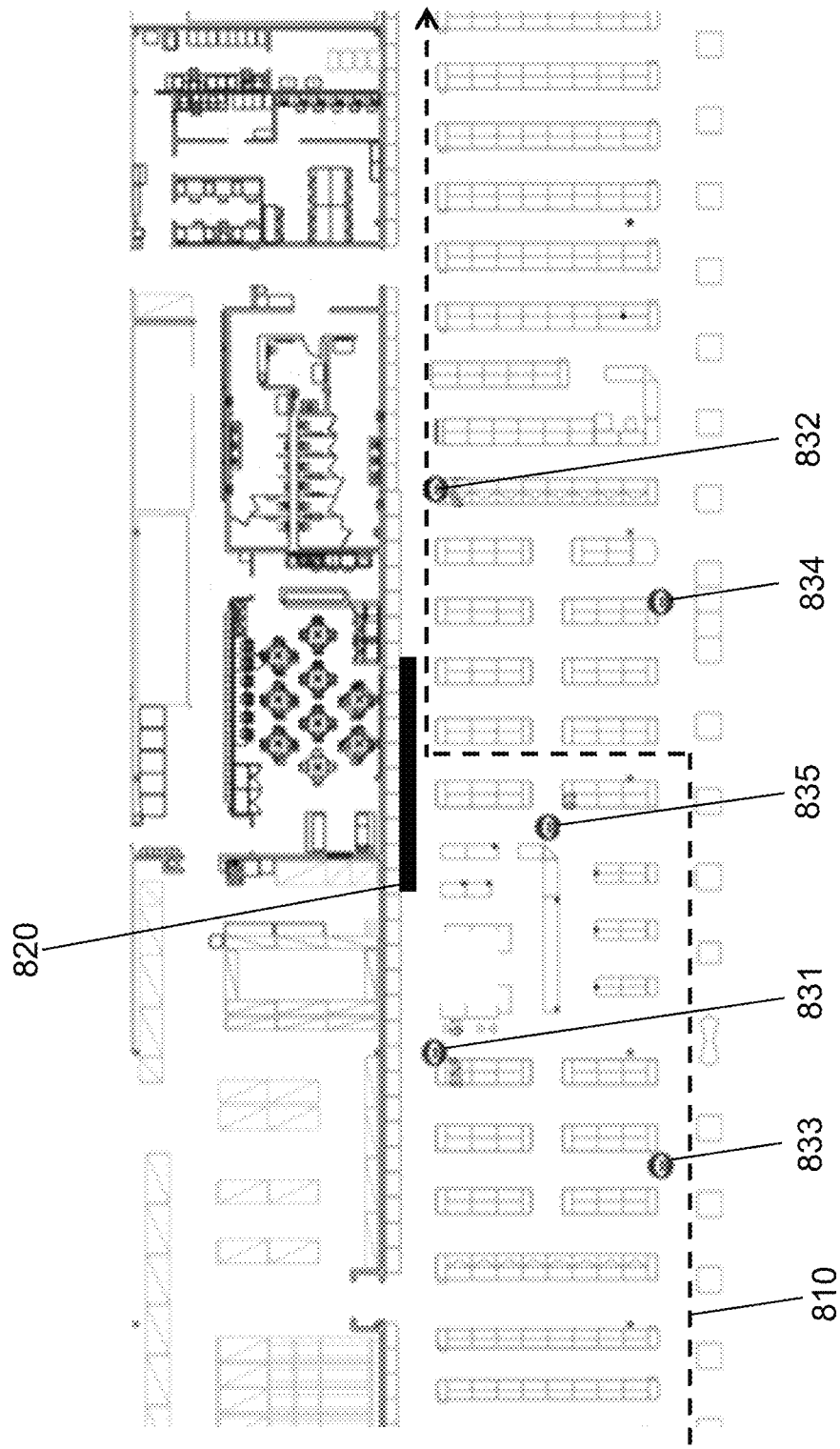
FIG. 8 illustrates an example of detecting an asset ID and generating its velocity data by an array of sensors associated with a media device, in accordance with some embodiments of the present teaching.

FIG. 8 illustrates an example of detecting an asset ID and generating its velocity data by an array of sensors associated with a media device, in accordance with some embodiments of the present teaching. FIG. 8 shows a moving path 810 of a shopping assistant device, e.g. a handheld or wheeled shopping cart, used by a customer to shop in the store. A uniquely identifiable RF tag may be coupled to the shopping cart. In this example, when the shopping cart passes by an advertisement shown on a display device 820 for a product, arrayed RF readers 831, 832, 833, 834, 835 can capture the time-stamped location and velocity of the unique cart ID and its time within the detection range. Based on the captured velocity data, the system can determine the pass time period and the dwell time period to be used to evaluate an effectiveness of the advertisement as discussed above.

In some embodiments, the RF readers 831, 832, 833, 834, 835 may be overhead RF readers installed on the ceiling in front of the display device 820. In some embodiments, the query rate, detection rate or record rate for each RF reader can be adjusted. In some embodiments, a higher detection rate or sampling rate of each sensor in the sensor array can help the sensor array to: determine a more accurate velocity (speed and direction) of the asset ID, and to filter out outliers during velocity and dwell time estimation.

Figure 9:
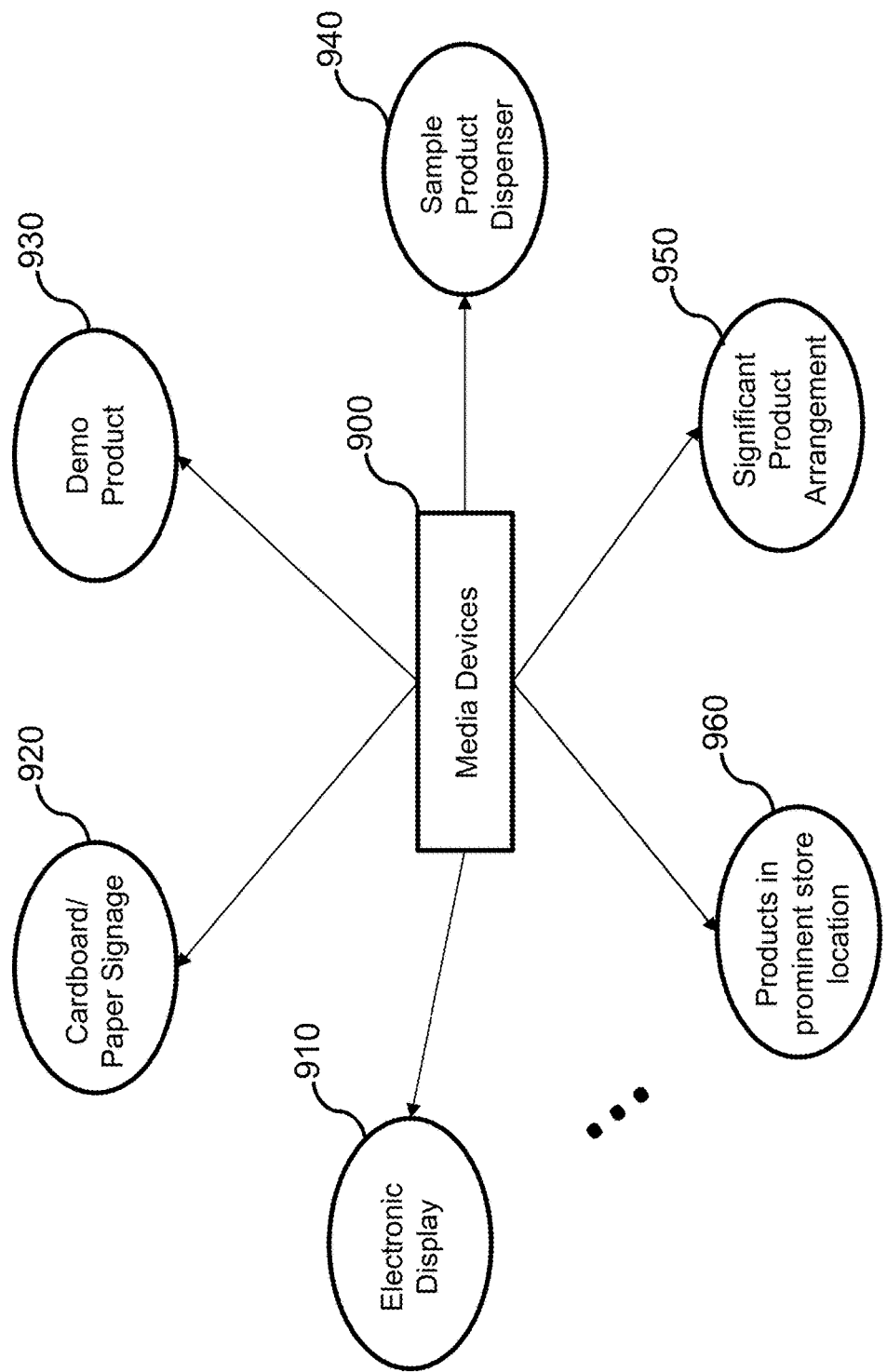
FIG. 9 illustrates various examples of media devices, in accordance with some embodiments of the present teaching.

Each media may have a unique media ID. FIG. 9 illustrates various examples of media devices 900, in accordance with some embodiments of the present teaching. As shown in FIG. 9, the media devices 900 may include but not limited to: an electronic display 910, e.g. LCD, LED, or other monitors showing an advertisement display with lopping video content campaign; a cardboard or paper signage 920, e.g. "Sale" or "New" tags, or stand-alone display banners and other printed signage; some demo products 930 placed for customers' interaction; a sample product dispenser 940 dispensing sample products; a significant product arrangement 950, such as large beer case stacks for Super Bowl promotions and designated seasonal product sections of the store; and products 960 set in prominent store locations, including main aisle features, entryways and endcaps to influence customers' purchasing decisions.

Figure 10:
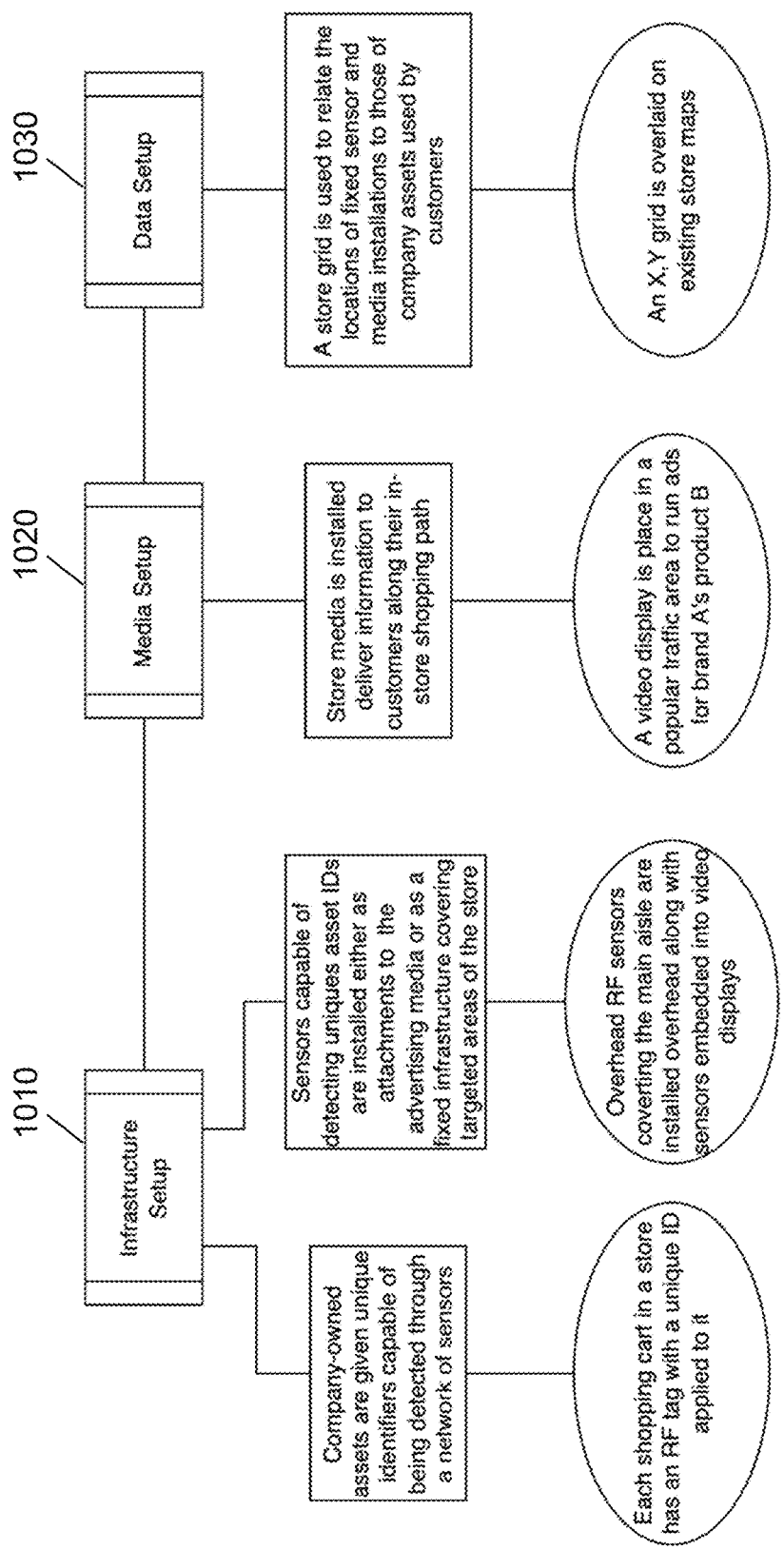
FIG. 10 illustrates an exemplary system establishment to determine content effectiveness in a store, in accordance with some embodiments of the present teaching.

FIG. 10 illustrates an exemplary system establishment to determine advertisement effectiveness in a store, in accordance with some embodiments of the present teaching. As shown in FIG. 10, the system establishment includes an infrastructure setup 1010; a media setup 1020; and a data setup 1030.

In one aspect of the infrastructure setup 1010, company-owned assets may be given unique identifiers capable of being detected through a network of sensors. As one example, each shopping cart in a store has an RF tag with a unique ID applied to it. In another aspect of the infrastructure setup 1010, sensors capable of detecting unique asset IDs may be installed either as attachments to the advertising media or as a fixed infrastructure covering targeted areas of the store. As one example, overhead RF sensors covering the main aisle are installed overhead along with sensors embedded into video displays.

For the media setup 1020, store media may be installed to deliver information to customers along their in-store shopping path. As one example, a video display is placed in a popular traffic area to run advertisements for brand A's product B.

For the data setup 1030, a store grid may be used to relate the locations of fixed sensors and media installations to those of company-owned assets used by customers. As one example, a grid (X, Y) is overlaid on existing store maps to help determining a relationship between sensors, media, and asset IDs.

Figure 11:
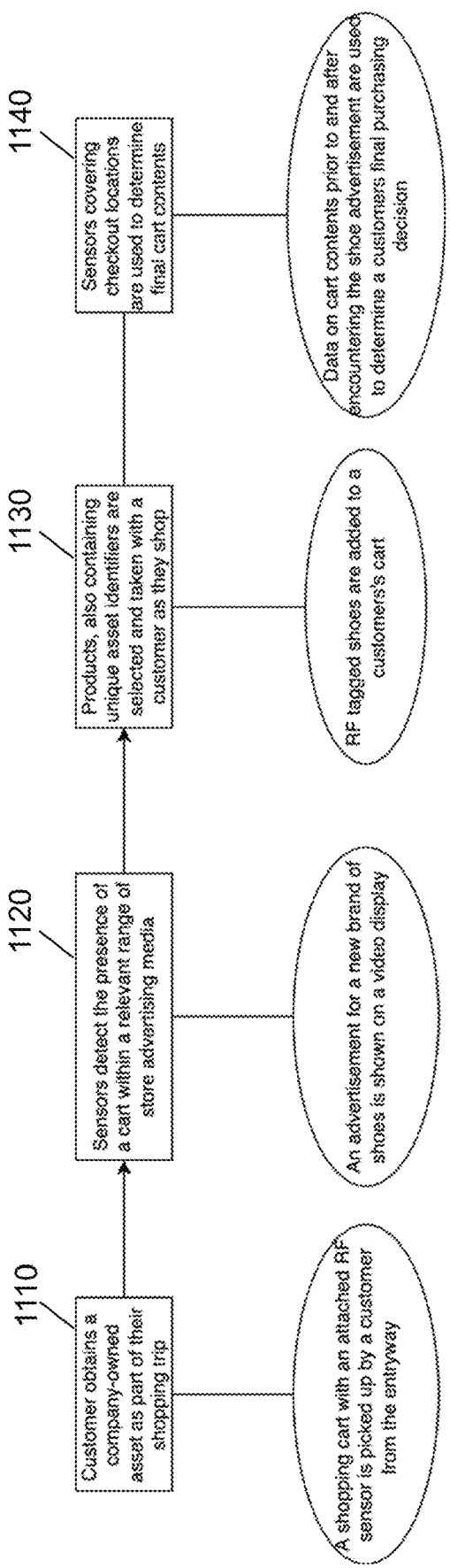
FIG. 11 illustrates an exemplary method to determine content effectiveness based on a shopping journey of a customer, in accordance with some embodiments of the present teaching.

FIG. 11 illustrates an exemplary method to determine advertisement effectiveness based on a shopping journey of a customer, in accordance with some embodiments of the present teaching. At step 1110, a customer obtains a company-owned asset as part of the customer's shopping trip. For example, a shopping cart with an attached RF tag is picked up by a customer from the entryway.

At step 1120, sensors can detect the presence of a cart within a relevant range of an advertising media in the store. For example, an advertisement for a new brand of shoes is shown on a video display, and an RF reader near the video display can detect presence of all shopping carts passing by or being close to the video display.

At step 1130, products, which may also contain unique asset identifiers, are selected and taken with a customer during shopping. For example, a pair of RF tagged shoes is added to a customer's cart.

At step 1140, sensors covering checkout stations are used to determine final cart contents in the purchase order. For example, data on cart contents prior to and after encountering the shoe advertisement are used to determine a customer's final purchasing decision.

In some embodiments, based on the above method, the system can determine an effectiveness of the shoe advertisement. For example, a customer starts the shopping journey at 12:00 PM. Then at 12:05 PM, the system determines that the shoe advertisement is displayed to the customer, based on detection of the customer's shopping cart RFID by an RFID reader near the advertisement display. Then the customer added the shoes as advertised into the shopping cart. At 12:20 PM, the customer goes through a checkout station, such that the system determines that the customer did purchase the shoes that the customer was advertised at 12:05 PM, e.g. based on detection of the customer's shopping cart RFID by an RFID reader near the checkout station, and the purchase data recorded from the purchase order of the customer recorded by the checkout station.

Figure 12:
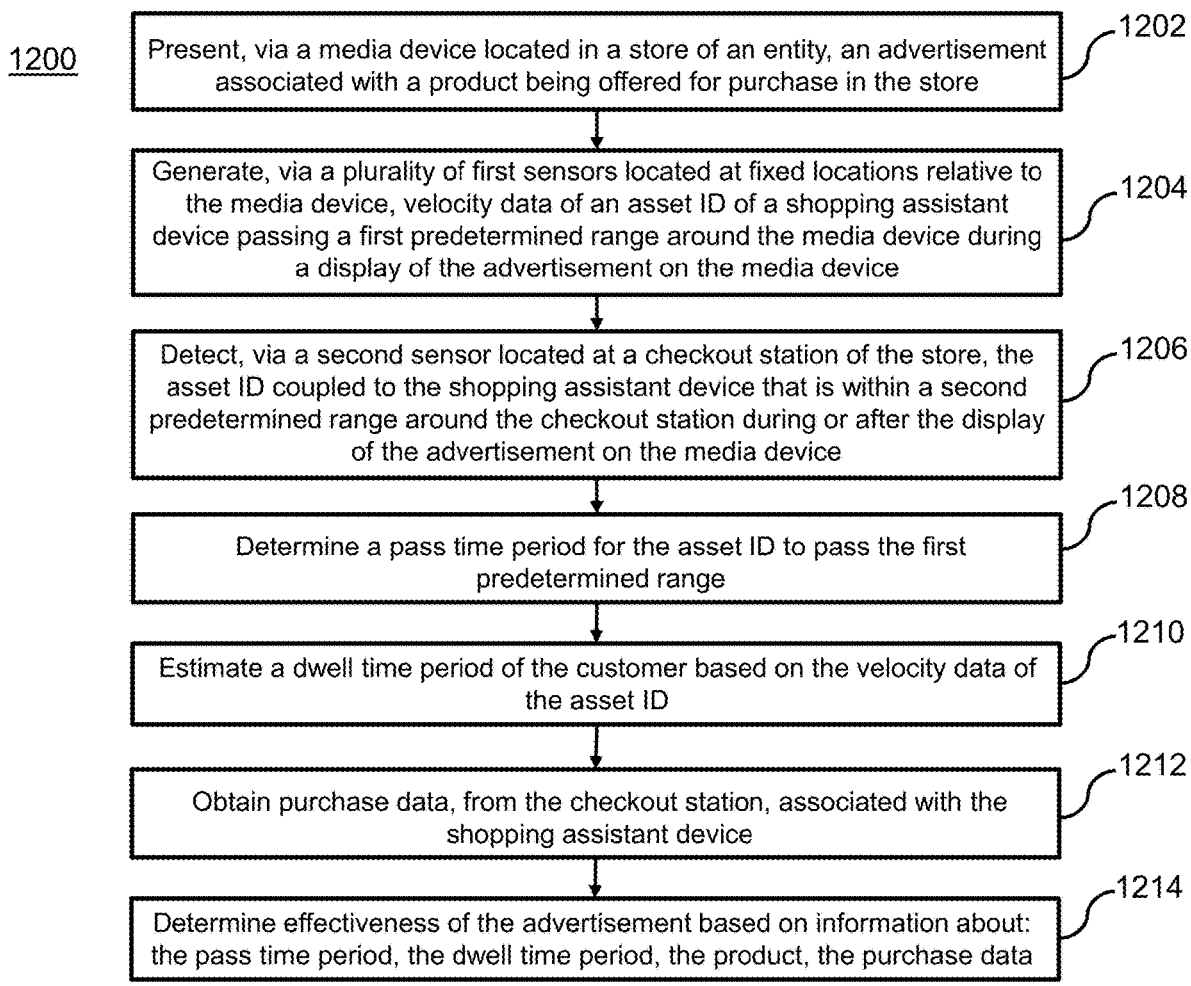
FIG. 12 is a flowchart illustrating a method for determining content effectiveness in a store, in accordance with some embodiments of the present teaching.

FIG. 12 is a flowchart illustrating a method 1200 for determining advertisement effectiveness in a store, in accordance with some embodiments of the present teaching. At operation 1202, an advertisement is presented via a media device located in a store of an entity, where the advertisement is associated with a product being offered for purchase in the store. At operation 1204, velocity data of an asset ID of a shopping assistant device passing a first predetermined range are generated via a plurality of first sensors located at fixed locations relative to the media device, where the shopping assistant device passes the first predetermined range around the media device during a display of the advertisement on the media device. At operation 1206, the asset ID coupled to the shopping assistant device is detected via a second sensor located at a checkout station of the store, where the shopping assistant device is within a second predetermined range around the checkout station during or after the display of the advertisement on the media device.

At operation 1208, a pass time period is determined for the asset ID to pass the first predetermined range. At operation 1210, a dwell time period of the customer is estimated based on the velocity data of the asset ID. At operation 1212, purchase data associated with the shopping assistant device is obtained from the checkout station. At operation 1214, an effectiveness of the advertisement is determined based on information about: the pass time period, the dwell time period, the product, and the purchase data.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMS, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

Each functional component described herein can be implemented in computer hardware, in program code, and/or in one or more computing systems executing such program code as is known in the art. As discussed above with respect to FIG. 2, such a computing system can include one or more processing units which execute processor-executable program code stored in a memory system. Similarly, each of the disclosed methods and other processes described herein can be executed using any suitable combination of hardware and software. Software program code embodying these processes can be stored by any non-transitory tangible medium, as discussed above with respect to FIG. 2.

The foregoing is provided for purposes of illustrating, explaining, and describing embodiments of these disclosures. Modifications and adaptations to these embodiments will be apparent to those skilled in the art and may be made without departing from the scope or spirit of these disclosures. Although the subject matter has been described in terms of exemplary embodiments, it is not limited thereto. Rather, the appended claims should be construed broadly, to include other variants and embodiments, which can be made by those skilled in the art.

What is claimed is:

1. A system configured to determine content effectiveness, comprising:
   a media device located at a physical store associated with an entity and configured to display content associated with a product being offered for purchase in the physical store, wherein a shopping assistant device owned by the entity is used by a customer to assist the customer's shopping in the physical store and has an asset identifier (ID) coupled to the shopping assistant device;

a plurality of velocity sensors configured to generate timestamped velocity data of the asset ID passing a first predetermined range around the media device during a display of the content on the media device, wherein the plurality of velocity sensors comprises a plurality of aisle sensors over an aisle of the physical store and a media sensor attached to the media device, wherein the timestamped velocity data of the asset ID is generated by one or more of the plurality of velocity sensors based on triangulating a plurality of time-stamped locations of the shopping assistant device based on input from at least three of the plurality of velocity sensors;

a detection sensor configured to detect the asset ID coupled to the shopping assistant device that is within a second predetermined range around a checkout device in the physical store during or after the display of the content on the media device; and at least one processor operatively coupled to the plurality of velocity sensors and the detection sensor, and configured to:
determine a pass time period for the asset ID to pass the first predetermined range,
estimate a dwell time period of the customer based at least in part on the generated timestamped velocity data of the asset ID generated by the plurality of velocity sensors and a predetermined moving speed threshold,
obtain purchase data associated with the shopping assistant device from the checkout device upon the detection sensor detecting the asset ID, and
determine an effectiveness of the content based on at least: the pass time period, the dwell time period, the product, a display time period during which the media device is to display the content, and the purchase data.

2. The system of claim 1, wherein the content displayed on the media device includes one or more advertisements of the product.

3. The system of claim 1, wherein:
the plurality of aisle sensors are located at fixed locations in a proximity of the media device;
the detection sensor is located in a proximity of the checkout device in the physical store; and
the purchase data is obtained from the checkout device.

4. The system of claim 3, wherein the timestamped velocity data of the asset ID is generated based on:
computing a moving speed of the asset ID based on the plurality of time-stamped locations, wherein the timestamped velocity data of the asset ID includes the plurality of time-stamped locations and the moving speed.

5. The system of claim 4,
wherein:
the pass time period is determined based on timestamps when the asset ID enters and exits the first predetermined range; and
the dwell time period is estimated based on a time period during which the moving speed of the asset ID is below the predetermined moving speed threshold.

6. The system of claim 5, wherein the effectiveness of the content is determined based on:
estimating an amount of content information taken in by the customer during the display of the content based on the pass time period and the dwell time period;

determining a final purchase decision of the customer regarding the product based on information about the product and the purchase data obtained from the checkout device; and
determining the effectiveness of the content based on the amount of content information and the final purchase decision.

7. The system of claim 6, wherein the effectiveness of the content is determined further based on: estimated amount of content information taken in by additional customers, and final purchase decisions of the additional customers.

8. The system of claim 1, wherein:
the media device is one of: an electronic display device, a cardboard, a paper signage, a stand-alone display banner, a demo product, a sample product dispenser, or a product arrangement;
the shopping assistant device is one of: a wheeled shopping cart, a motorized shopping cart, a handheld basket, a handheld checkout equipment, a pair of glasses, a tablet, or a phone provided by the store to assist shopping of customers; and
the asset ID is detected based on at least one of: a Radio-Frequency IDentification (RFID), a quick response (QR) code, a universal product code (UPC) code, a Near-Field Communication (NFC), Wi-Fi, or Bluetooth Low Energy (BLE).

9. A computer-implemented method for determining content effectiveness, comprising:
presenting, via a media device located at a physical store associated with an entity, content associated with a product being offered for purchase in the physical store, wherein a shopping assistant device owned by the entity is used by a customer to assist the customer's shopping in the physical store and has an asset identifier (ID) coupled to the shopping assistant device;
providing a plurality of velocity sensors at the physical store, the plurality of velocity sensors comprising a plurality of aisle sensors over an aisle of the physical store and a media sensor attached to the media device;
providing a detection sensor in a proximity of a checkout device in the physical store;
generating, by one or more of the plurality of velocity sensors, timestamped velocity data of the asset ID passing a first predetermined range around the media device during a display of the content on the media device, wherein the timestamped velocity data of the asset ID is generated based on triangulating a plurality of time-stamped locations of the shopping assistant device based on input from at least three of the plurality of velocity sensors;
detecting, via the detection sensor, that the asset ID coupled to the shopping assistant device is within a second predetermined range around the checkout device in the physical store during or after the display of the content on the media device;
determining a pass time period for the asset ID to pass the first predetermined range;
estimating a dwell time period of the customer based at least in part on the generated timestamped velocity data of the asset ID and a predetermined moving speed threshold;
obtaining purchase data associated with the shopping assistant device from the checkout device upon the detection sensor detecting the asset ID; and
determining an effectiveness of the content based on at least: the pass time period, the dwell time period, the product, a display time period during which the media device is to display the content, and the purchase data.

10. The computer-implemented method of claim 9, wherein the content displayed via the media device includes one or more advertisements of the product.

11. The computer-implemented method of claim 9, wherein:
the plurality of aisle sensors are located at fixed locations in a proximity of the media device; and
the purchase data is obtained from the checkout device.

12. The computer-implemented method of claim 11, wherein generating the timestamped velocity data of the asset ID of the asset ID comprises:
computing a moving speed of the asset ID based on the plurality of time-stamped locations, wherein the time-stamped velocity data of the asset ID includes the plurality of time-stamped locations and the moving speed.

13. The computer-implemented method of claim 12, wherein:
the pass time period is determined based on timestamps when the asset ID enters and exits the first predetermined range; and
the dwell time period is estimated based on a time period during which the moving speed of the asset ID is below the predetermined moving speed threshold.

14. The computer-implemented method of claim 13, wherein determining the effectiveness of the content comprises:
estimating an amount of content information taken in by the customer during the display of the content based on the pass time period and the dwell time period;
determining a final purchase decision of the customer regarding the product based on information about the product and the purchase data obtained from the checkout device; and
determining the effectiveness of the content based on the amount of content information and the final purchase decision.

15. The computer-implemented method of claim 14, wherein the effectiveness of the content is determined further based on: estimated amount of content information taken in by additional customers, and final purchase decisions of the additional customers.

16. The computer-implemented method of claim 9, wherein:
the media device is one of: an electronic display device, a cardboard, a paper signage, a stand-alone display banner, a demo product, a sample product dispenser, or a product arrangement;
the shopping assistant device is one of: a wheeled shopping cart, a motorized shopping cart, a handheld basket, a handheld checkout equipment, a pair of glasses, a tablet, or a phone provided by the store to assist shopping of customers; and
the asset ID is detected based on at least one of: a Radio-Frequency IDentification (RFID), a quick response (QR) code, a universal product code (UPC) code, a Near-Field Communication (NFC), Wi-Fi, or Bluetooth Low Energy (BLE).

* * * * *